United States Patent
Chang et al.

(10) Patent No.: US 8,217,590 B2
(45) Date of Patent: *Jul. 10, 2012

(54) WINDOW-MOUNTED SOLAR POWERED ILLUMINATION DEVICE

(75) Inventors: Shunyung Chang, Taipei (TW); Sungkai Chen, Yonghe (TW); Kuanwei Lee, Taipei (TW); Chiahsiung Hsueh, Taipei (TW)

(73) Assignee: Tsann Kuen (Zhangzhou) Enterprise Co., Ltd., Zhangzhou, Fujian (CN)

( * ) Notice: Subject to any disclaimer, the term of this patent is extended or adjusted under 35 U.S.C. 154(b) by 366 days.

This patent is subject to a terminal disclaimer.

(21) Appl. No.: 12/424,695

(22) Filed: Apr. 16, 2009

(65) Prior Publication Data

US 2009/0261736 A1   Oct. 22, 2009

(30) Foreign Application Priority Data

Apr. 16, 2008   (TW) ................................ 97206493 U

(51) Int. Cl.
*H05B 41/36* (2006.01)
(52) U.S. Cl. ......... 315/307; 136/243; 136/244; 136/251
(58) Field of Classification Search .................. 315/307; 136/243, 244, 251
See application file for complete search history.

(56) References Cited

U.S. PATENT DOCUMENTS

| | | | | |
|---|---|---|---|---|
| 355,021 A * | 12/1886 | Lang | .......................... | 248/205.8 |
| 3,750,991 A * | 8/1973 | Ragir | .......................... | 248/205.8 |
| 4,539,516 A * | 9/1985 | Thompson | .................. | 320/101 |
| 4,823,241 A * | 4/1989 | Trattner | ........................ | 362/183 |
| 4,848,713 A * | 7/1989 | Adams | ........................ | 248/206.2 |
| 6,308,923 B1 * | 10/2001 | Howard | .................. | 248/205.5 |
| 7,701,166 B2 * | 4/2010 | Lin et al. | ........................ | 320/101 |
| 7,784,992 B2 * | 8/2010 | Gustaveson | .................. | 362/641 |
| 7,837,162 B2 * | 11/2010 | Adams | ........................ | 248/205.5 |
| 7,972,048 B1 * | 7/2011 | Lamborn | ........................ | 362/541 |
| 2004/0252492 A1 * | 12/2004 | Peterson | ........................ | 362/183 |
| 2008/0029153 A1 * | 2/2008 | Margalit | ........................ | 136/252 |
| 2008/0157711 A1 * | 7/2008 | Chiang et al. | .................. | 320/101 |
| 2008/0298051 A1 * | 12/2008 | Chu | ........................ | 362/183 |
| 2009/0039797 A1 * | 2/2009 | Wang et al. | .................. | 315/246 |
| 2009/0059574 A1 * | 3/2009 | Lewis et al. | .................. | 362/183 |
| 2011/0089839 A1 * | 4/2011 | Chen | ........................ | 315/149 |

* cited by examiner

*Primary Examiner* — Jacoby Y Choi
*Assistant Examiner* — Anthony Arpin
(74) *Attorney, Agent, or Firm* — Kening Li; Pinsent Masons LLP

(57) ABSTRACT

A solar powered illuminating device comprises a shell and a lampshade, wherein said shell is capable of being hung on a transparent surface comprising a backlight surface and a light-receiving surface, wherein said light-receiving surface is abutted against said transparent surface, said shell further comprising: a solar panel, an illuminating module, a battery unit and a power control module. Said solar panel is arranged on the light-receiving surface for receiving solar energy and converting solar energy into electric energy; said illuminating module is arranged on the backlight surface; said battery unit is used for storing the electric energy and said power control module connects said solar panel and said battery unit, charges the battery unit, and controls the discharge of rechargeable batteries of said battery unit. The lampshade covers the backlight surface in a position corresponding to said illuminating module.

8 Claims, 4 Drawing Sheets

US 8,217,590 B2

WINDOW-MOUNTED SOLAR POWERED ILLUMINATION DEVICE

CROSS REFERENCES TO RELATED APPLICATIONS

This application claims priority to Taiwan Application No.: 097206493, filed on Apr. 16, 2008, the entire disclosure of which is incorporated herein by reference.

FIELD OF THE INVENTION

The present invention generally relates to an illuminating device, particularly, to a wall-hung and solar powered illuminating device.

BACKGROUND OF THE INVENTION

The energy problems have been discussed frequently in recent years. To meet the increasing energy demands around the world and to reduce energy consumption, more and more researches and developments are focusing on renewable energy. Solar energy is one of the best alternative as it is capable of producing a large amount of energy while meeting the requirement of environment protection.

Despite its great potential, one major limitation of solar energy is that in order for it to function, a solar-powered device needs to be exposed to solar radiation. Yet many devices used in the environment of our daily life, especially in-doors, are rarely, if ever, exposed to solar radiation directly. So the solar energy that can be converted into electric energy is limited. This is one of that reasons why solar energy device cannot be used conveniently and widely in every environment.

Especially in reference to illuminating devices such as lights and lamps used at night for every family, or signs and the like used at night, it would highly desirable if they can be charged by solar energy. However, currently available devices need to be taken outdoors during the day for charging and indoors where they are used. A need exists for improvements that would free the users from such cumbersome practice.

SUMMARY OF THE INVENTION

An object of the invention is to effectively integrate the functions of a solar power supply device and an illuminating device. In one embodiment, this is accomplished by using the wall-hung design, the devices can be used indoors, whereby when there is solar radiation during daytime, the device need not be removed outdoor or occupy a lot of space for charging; when there is no solar radiation at night, the device can be hung and used easily in any place indoors. Thus, the solar charging and illuminating device can be removed and hung conveniently for charging and illuminating anytime without engaging much place.

To achieve the abovementioned object, the present invention provides a wall-hanging solar charging and illuminating device comprising: a shell and a lampshade, wherein said shell comprises a backlight surface and a light-receiving surface and wall-hanging on a transparent outward surface, and the light-receiving surface is abutted against said transparent outward surface, said shell further comprising: a solar panel, an illuminating module, a battery unit and a power control module, wherein said solar panel is arranged on the light-receiving surface for receiving solar energy and converting solar energy into electric energy; said illuminating module is arranged on the backlight surface, said battery unit is used for storing electric energy, and said power control module is connected to the solar panel and the battery unit and is used for receiving electric energy converted by the solar panel, charging the rechargeable batteries and further controlling the discharge of battery unit, wherein said battery unit can generate a first output voltage for the illuminating module. The lampshade is covered on said backlight surface and is set in a position corresponding to the illuminating module.

Therefore, the advantages of the wall-hanging solar charging and illuminating device of the present invention is: providing an easy and convenient method of application, by which users only need to hang the illuminating device on a transparent outward surface, i.e. without any extra moving actions, the device can be charged by solar radiation in daytime, and produce a luminous source for illuminating and indicating at night.

Further features and advantages of the invention will become apparent in detail from the ensuing description of exemplary embodiments, aided by the accompanying drawings.

Figure 1:
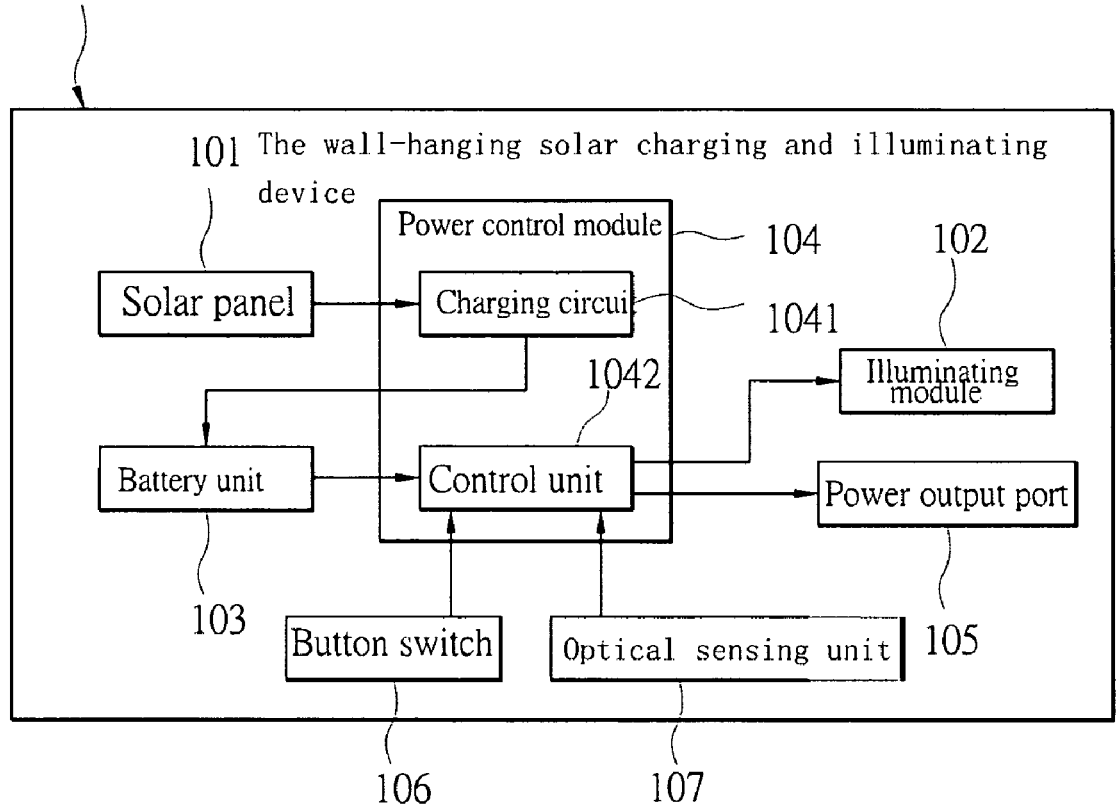
FIG. 1 is a block diagram of the wall-hanging solar charging and illuminating device in a preferred embodiment of the present invention.

In these figures:
1 Wall-hanging solar charging and illuminating device
10 Shell
1001 Backlight surface
1002 Light-receiving surface
101 Solar panel
102 illuminating module
103 battery unit
104 Power Control Module
1041 Charging Circuit
1042 Control Unit
105 Power output port
106 button switch
107 Optical sensing unit
108 Hanging aperture
1080 adhesive disc
11 lamp shade
2 Transparent outward surface
3 Combined power supply device
31 Secondary battery
32 Charging unit
33 First connecting unit
34 Processing unit
35 Power output unit
36 Power input unit
37 Operating unit
38 Display unit
4 conducting wire

DETAILED DESCRIPTION OF THE PREFERRED EMBODIMENT

The wall hanging solar charging and illuminating device of the present invention effectively integrates the functions of the solar power supply device and the illuminating device. The solar panel and illuminating module are disposed on opposite surfaces of the shell. By the wall-hanging design, the devices can be hung on a transparent outward surface or be used freely indoors well, thus when there is solar radiation in daytime, the device does not need to be removed outdoor or engage too much space for charging; while when there is no solar radiation at night, the solar charging and illuminating device can light in the afore hung position for illuminating and indicating. The device being wall-hanging has the advantage that it can be moved easily to any place in doors.

Figure 2:
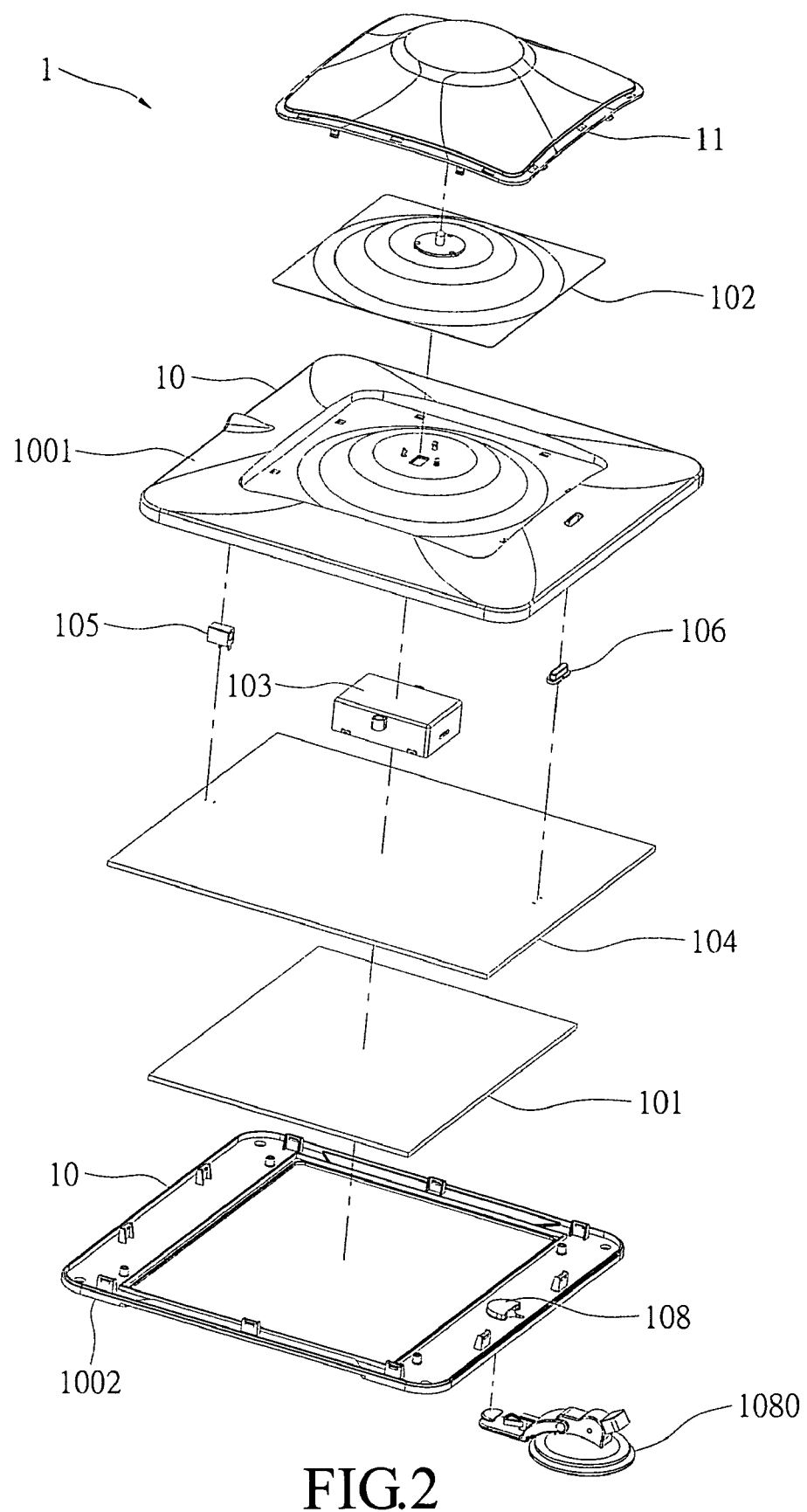
FIG. 2 is an exploded view of the wall-hanging solar charging and illuminating device in a preferred embodiment of the present invention.

Referring to FIG. 1 and FIG. 2, which are a block diagram and an exploded view of the wall-hanging solar charging and illuminating device in present invention respectively. As shown in the drawings, in this embodiment, a wall-hanging solar charging and illuminating device 1 comprising: a shell 10 and a lampshade 11, wherein the shell 10 comprises a backlight surface 1001 and a light-receiving surface 1002, and can be hung on a transparent outward surface (not shown), e.g.: outward glass windows or doors. Therefore, when the shell 10 is hung, the light-receiving surface 1002 is abutted against the transparent outward surface to receive solar radiation directly. Furthermore, in one design (as shown in FIG. 2), a hole 108 can be disposed on the light-receiving surface 1002 of the shell 10 for hanging on the transparent outward surface. When the device is hung via hole 108, a corresponding hook must be set on the transparent outward surface, therefore, to the convenience for the users, the hole 108 is further connected to an adhere disc 1080, by which the wall-hanging solar charging and illuminating device 1 can be hung on the transparent outward surface by adhering.

The shell 10 further includes: a solar panel 101, an illuminating module 102, a battery unit 103, a power control module 104, a power output port 105, a button switch 106 and an optical sensing unit 107. Herein the solar panel 101 is set on the light-receiving surface 1002 of shell 10 for receiving solar energy so as to convert the solar energy into the electric energy. The illuminating module 102 is set on the backlight surface 1001 of shell 10 for producing illumination, and in design, illuminating module 102 can be, for example, an LED which is used widely.

Moreover, the battery unit 103, which can be lithium batteries, nickel hydrogen batteries, nickel cadmium batteries, lead acid batteries or lithium polymer batteries, is used for storing the electric energy converted by solar panel 101. Power control module 104 connected between the solar panel 101 and battery unit 103 is used for receiving the electric energy converted by solar panel 101, and further controlling the discharge of battery unit 103 for producing a first output voltage for illuminating module 102.

Furthermore, power control module 104 further comprises a charging circuit 1041 and a control unit 1042. The charging circuit 1041 is used for charging the battery unit 103 with electric energy converted by solar panel 101. The control unit 1042 is connected to the battery unit 103 and is used for controlling the discharge of battery unit 103 to convert the first output voltage to illuminating module 102. Moreover, the control unit 1042 can be designed for different voltage converting circuits (not shown) to control the discharge of the battery unit 103 for converting different output voltage. For example, control unit 1042 in this embodiment not only converts and exports the first output voltage, but also can convert and export a second output voltage for an external device (not shown) connected to the wall hanging solar charging and illuminating device 1, which makes the wall hanging solar charging and illuminating device 1 be more beneficial and practical.

Corresponding to the output of the second output voltage, a power output port 105 is arranged on the wall hanging solar charging and illuminating device 1 for connecting with the control unit 1042 to receive the second output voltage provided for the external device. Certainly, there is not any limitation for the actual voltages in abovementioned first and second output voltage in this embodiment. The voltages can be decided by different designed voltages converting circuits according to different practical applications. And power output port 105 can be designed such as general power output terminal or Universal Serial Bus port. Herein if it is designed by Universal Serial Bus port, the second output voltage can be stabled at 5 volt by designing a voltage converting circuit.

In this embodiment, the wall-hanging solar charging and illuminating device in present invention further comprises a button switch 106 which can be arranged on any surfaces of shell 10 (e.g. arranged on backlight surface 1001 of shell 10, as shown in FIG. 2). Button switch 106 is mainly used for connecting control power 1042 and receiving the pressing operation of users to control the control unit 1042 to start or stop the output of the first output voltage. In other words, users can control illuminating module 102 to produce illuminating source by the operation of button switch 106.

Furthermore, another way of controlling whether the illuminating module 102 to be lit up or not is to set an optical sensing unit 107 in wall hanging solar charging and illuminating device 1. Optical sensing unit 107 is also connected with control unit 1042 and set on the backlight surface 1001 for detecting the intensity of illumination at hanging place and provide the intensity of illumination for control unit 1042. Then the control unit 1042 can start or stop the output of the first output voltage automatically according to the present light, thus realize the control of illuminating module 102. In practical application, for example, a defaulting brightness is set in control unit 1042, after the present light and the defaulting brightness is compared by control unit 1042, if the present light is lower than the defaulting brightness, the first output voltage is output automatically; and contrarily, the first output voltage is stop. By this design, wall hanging solar charging and illuminating device 1 will be lit at night automatically.

Certainly, as shown in FIG. 1, a button switch 106 and an optical sensing unit 107 are both used in this embodiment. In this way, wall hanging solar charging and illuminating device 1 not only can be turned on or turned off the luminous source automatically according to the intensity of illumination firstly, but also can be further controlled in manual operation by users to open or close the luminous source.

At last, to protect the illuminating module 102 and make luminous source more equality, the lampshade 11 included in wall hanging solar charging and illuminating device 1 is set at a position corresponding to illuminating module 102 and covered on the backlight surface 1001 in shell 10.

In summary, the embodiment of wall hanging solar charging and illuminating device 1 has been described by abovementioned description of circuit diagram and perspective view.

Figure 3:
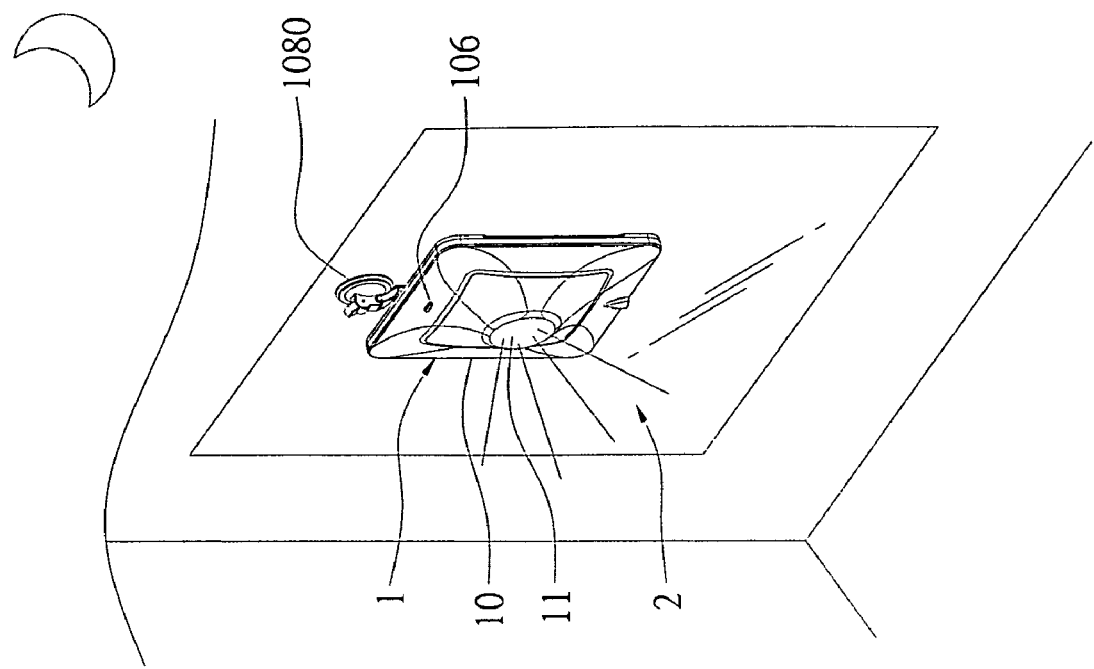
FIG. 3 is a perspective view of the wall-hanging solar charging and illuminating device in the first embodiment of the present invention.
Figure 3:
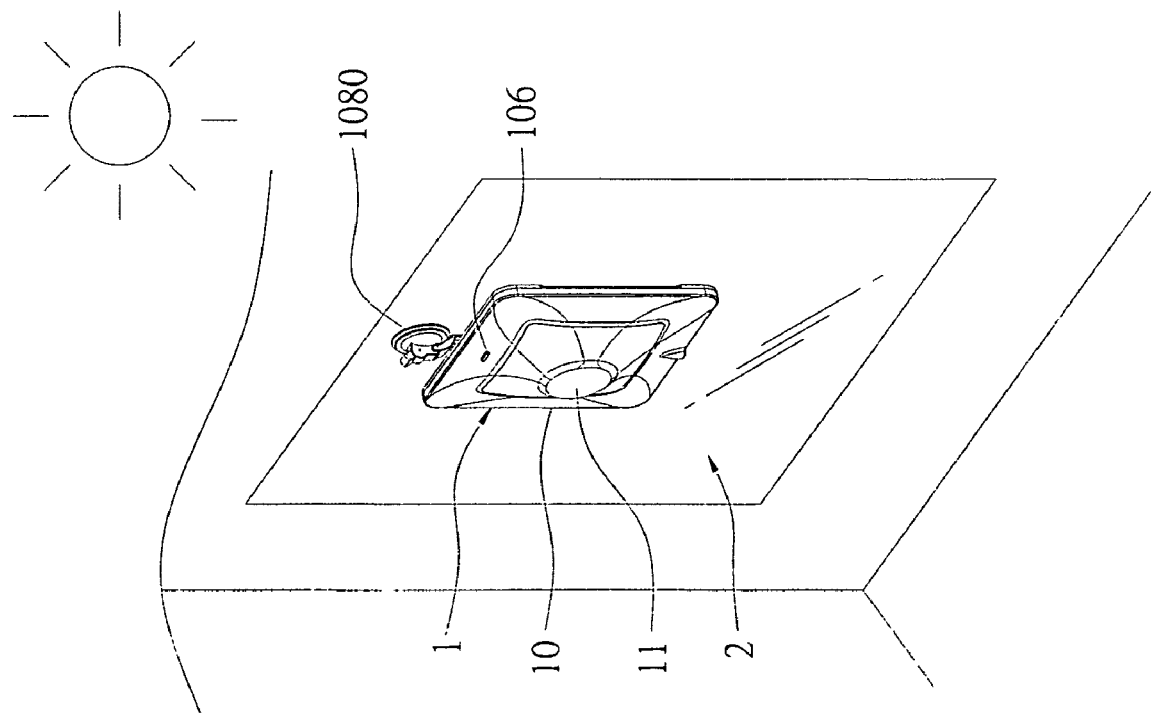

Please refer to FIG. 3, it is the perspective view of wall hanging solar charging and illuminating device of the first embodiment in present invention. This embodiment is used for further illustrating clearly about the practical application status of wall hanging solar charging and illuminating device 1. As shown in FIG. 3, shell 10 of wall hanging solar charging and illuminating device 1 in this embodiment is adhered to and hung on a transparent outward-facing surface 2 (glass window) by an adhere disc 1080, and the luminous source is controlled simply by button switch 106.

Therefore, as shown in the left of FIG. 3, in daytime, wall hanging solar charging and illuminating device 1 can receive solar energy and convert solar energy into electric energy, and then start charging. Thus, users can manually control whether to make the wall hanging solar charging and illuminating device 1 lit up by operating button switch 106 according to the intensity of illumination indoors. While as shown in the right in FIG. 3, at night, users can press the button switch 106 directly to turn on luminous source.

Certainly, users can easily take off wall hanging solar charging and illuminating device 1 and move it conveniently to hang on any place for use.

Figure 4:
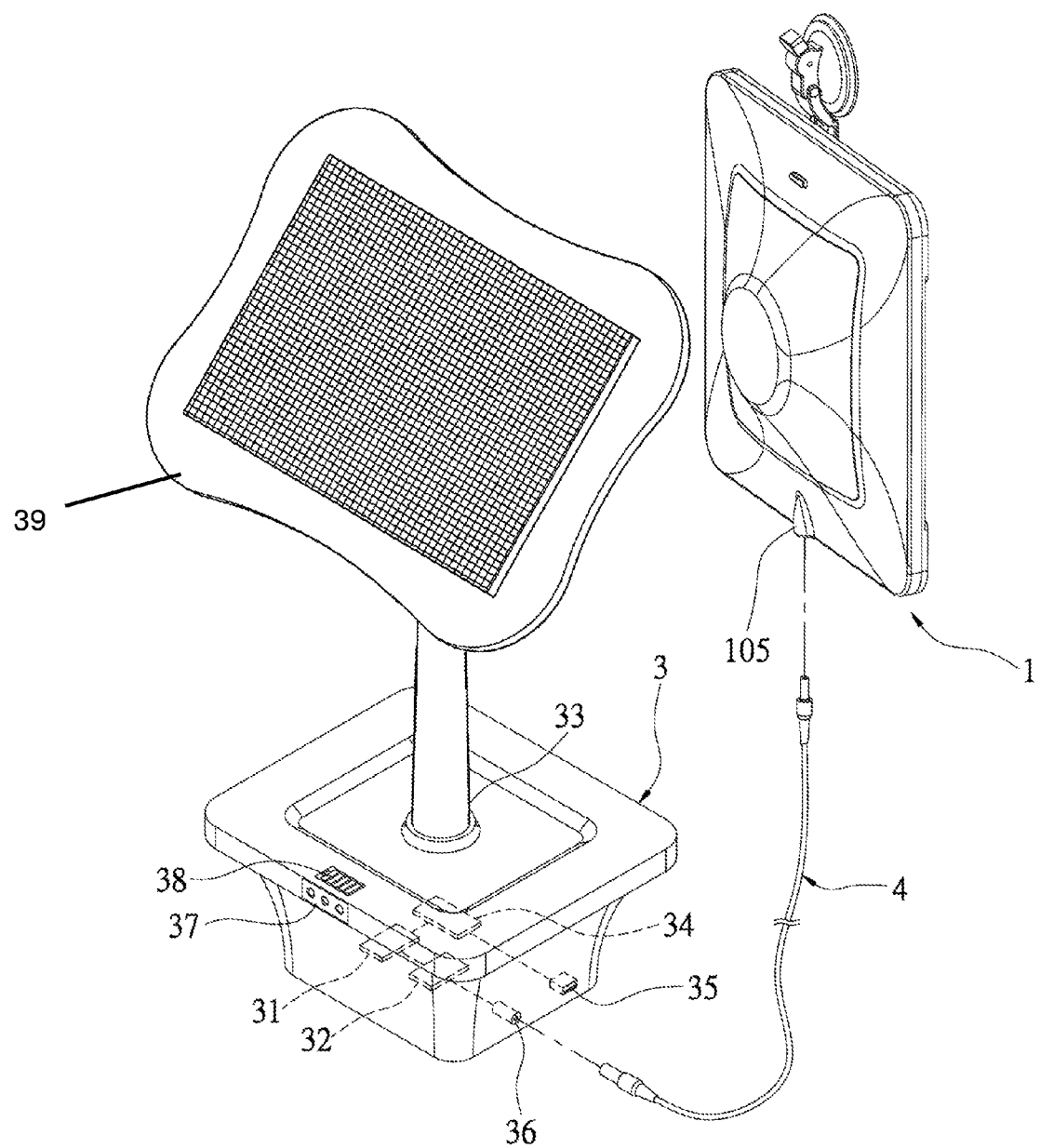
FIG. 4 is a perspective view of the wall-hanging solar charging and illuminating device in the second embodiment of the present invention.

Please refer to FIG. 4, which is the perspective view of wall hanging solar charging and illuminating device 1 of the second embodiment of the present invention. As shown in FIG. 4, this embodiment presents that the wall-hanging solar charging and illuminating device 1 not only can produce luminous source by power supply from solar energy, but also can be connected to an external device through power output port 105, for example, said external device can be a combined with power supply device 3. Therefore, wall hanging solar charging and illuminating device 1 can not only charge its battery unit 103 by solar energy, but also can further provide a second output voltage to be combined with power supply device 3 for charging. Thus, more functions of wall hanging solar charging and illuminating device 1 can be conveniently extended.

The following is further illustration for combined power supple device 3. Combined power supple device 3 includes: a secondary batteries 31, a charging unit 32, a first connecting unit 33, a processing unit 34, a power output unit 35, a power input unit 36, an operating unit 37 and a display unit 38. Wherein power input unit 36 is connected to power output port 105 by a power conducting wire 4 to receive the second output voltage. While charging unit 32 is connected to power input unit 36 to receive the second output voltage and then charge the secondary battery 31.

During the use proceeding of the whole combined power supply device 3, when inserted into an extend solar panel (not shown), the first connecting unit 33 is used for transferring the electric energy converted by solar panel to charging unit 32 and then charging unit 32 can charge secondary battery 31; while inserted into an electronic device, the first connecting unit 33 is used for transferring a first voltage generated by secondary battery 31 to the electronic device. At last, processing unit 34 is connected to secondary battery 31 to control the second voltage generated by the secondary battery 31, and then provide the voltage for an application device via power output unit 35.

Finally, operating unit 37 shown in the drawing is used for adjusting the second voltage controlled by processing unit 34 for users. And displaying unit 38 is used for displaying the status of the secondary batteries 31 of combined power supply device 3. Therefore, wall hanging solar charging and illuminating device 1 can be used more widely via connecting to the combined power supply device 3.

In summary, the wall hanging solar charging and illuminating device in present invention can effectively integrate the functions of the solar power supply device and the illuminating device, and the solar panel and illuminating module are disposed on the opposite surfaces of the shell, by the wall-hanging design, the devices can be hung on a transparent outward surface or be used freely indoors circumstance well, thus when there is solar radiation in daytime, the device does not need to be removed outdoor or engages too much space for charging; while when there is no solar radiation at night, the solar charging and illuminating device can light in the afore hung position for illuminating and indicating. The device being wall-hanging has an advantage that it can be moved easily to any place in doors.

The foregoing description is presented just as detailed illustration and drawings of the embodiment of the present invention and not intended to limit the present invention. All scope of the present invention should be determined by the following invention claims. Any modifications and variations, which can be thought of by ordinary skill in the art of the present invention, are within the scope of the present invention as determined by the following invention claims.

What is claimed is:

1. A solar charged illuminating device comprising: a shell hung on a transparent surface, wherein the shell comprises a backlight surface; a light-receiving surface, wherein the light-receiving surface is abutted against the transparent surface; and a solar panel set on said light-receiving surface to receive solar energy and to convert solar energy into electric energy; an illuminating module set on said backlight surface; a battery unit for storing the electric energy and producing a first output voltage to said illuminating module; a power control module connected with said solar panel and said battery unit, wherein the power control module is used for receiving electric energy converted by said solar panel, charging the battery unit and controlling the discharge of battery unit; and a lampshade set at a position corresponding to said illuminating module and covering said backlight surface;

wherein said power control module further comprises: a charging circuit connected to said solar panel and said battery unit for charging said battery unit; and a control unit connected with said battery unit for controlling the discharge of said battery unit; wherein said battery unit generates said first output voltage and a second output voltage;

wherein the solar charged illuminating device further comprises a power output port connected to said control unit for receiving said second output voltage;

wherein the second output voltage is provided to an exterior device which is a combined power supply device comprising: a secondary battery, a charging unit, a first connecting unit, a processing unit, a power output unit and a power input unit; wherein said power input unit is used for receiving said second output voltage, said charging unit is connected to said power input unit to receive the second output voltage and charge the secondary battery; said first connecting unit is inserted into an extended solar panel or an electronic device; wherein said first connecting unit, when inserted into an the extended solar panel, is used for providing electric energy converted by the extended solar panel to said charging unit which charges said secondary battery, and when inserted into the electronic device is used for transferring a first voltage generated by said secondary battery to the electronic device; said processing unit is connected with said secondary battery and controls a second voltage generated by said secondary battery to provide the voltage for an application device via said power output unit.

2. The solar charged illuminating device according to claim 1, wherein said illuminating module is an LED illuminating module.

3. The solar charged illuminating device according to claim 1, wherein said power output port is a Universal Serial Bus port or a power output terminal.

4. The solar charged illuminating device according to claim 1 further comprising a button switch arranged on a surface of said shell and connected with said control unit, wherein the button switch controls said control unit to start or stop the output of said first output voltage.

5. The solar charged illuminating device according to claim 1, further comprising an optical sensing unit set on said backlight surface and connected with said control unit for detecting the intensity of illumination, wherein said control unit can start or stop the output of said first output voltage automatically according to the intensity of illumination.

6. The solar charged illuminating device according to claim 1, wherein said shell further comprises a hole for hanging the device on the transparent surface.

7. The solar charged illuminating device according to claim 6, wherein the hole is disposed on said light-receiving surface.

8. The solar charged illuminating device according to claim 7, wherein said hole is connected to an adhere disc for adhering to said transparent outward surface.

* * * * *